United States Patent
Lim et al.

(10) Patent No.: US 7,995,514 B2
(45) Date of Patent: Aug. 9, 2011

(54) RS-BASED NETWORK TRANSMISSION METHOD

(75) Inventors: Eun-Taek Lim, Suwon-si (KR); Zongchuang Liang, Beijing (CN); Qi Wu, Beijing (CN)

(73) Assignee: Samsung Electroncis Co., Ltd (KR)

(*) Notice: Subject to any disclaimer, the term of this patent is extended or adjusted under 35 U.S.C. 154(b) by 747 days.

(21) Appl. No.: 12/110,780

(22) Filed: Apr. 28, 2008

(65) Prior Publication Data

US 2008/0267113 A1    Oct. 30, 2008

(30) Foreign Application Priority Data

Apr. 27, 2007    (CN) .......................... 2007 1 0097588

(51) Int. Cl.
*H04B 7/204* (2006.01)

(52) U.S. Cl. ........ 370/319; 370/231; 370/235; 370/274; 370/310.2; 370/315; 370/324; 370/328; 370/492; 455/422.1; 455/7; 455/11.1; 455/12.1; 455/13.1; 455/13.2; 455/13.4; 455/502; 714/18; 714/748; 714/749; 714/750

(58) Field of Classification Search .................. 370/231, 370/274, 279, 293, 310.2, 315–318, 324, 370/325, 328–339, 349, 350, 492, 501, 503; 455/422.1, 7, 11.1, 12.1, 13.1, 13.2, 13.4, 455/502; 714/18, 708, 748–751
See application file for complete search history.

(56) References Cited

U.S. PATENT DOCUMENTS

| | | | |
|---|---|---|---|
| 2005/0048914 A1 | 3/2005 | Sartori et al. | |
| 2007/0081483 A1* | 4/2007 | Jang et al. | 370/315 |
| 2007/0298778 A1* | 12/2007 | Chion et al. | 455/422.1 |
| 2008/0108304 A1* | 5/2008 | Suga | 455/7 |
| 2008/0285499 A1* | 11/2008 | Zhang et al. | 370/315 |
| 2009/0073916 A1* | 3/2009 | Zhang et al. | 370/315 |

FOREIGN PATENT DOCUMENTS

| | | |
|---|---|---|
| EP | 1 773 091 | 4/2007 |
| WO | WO 2005/067173 | 7/2005 |

* cited by examiner

*Primary Examiner* — Aung S Moe
*Assistant Examiner* — Hoon J Chung
(74) *Attorney, Agent, or Firm* — The Farrell Law Firm, P.C.

(57) ABSTRACT

A Relay System (RS)-based cellular network transmission method for MT having a function of single input and single output is provided. The method includes transmitting broadcast information to all RSs and Mobile Terminals (MTs); transmitting required data to each RS in an Orthogonal Frequency Division Multiplexing (OFDM) mode; performing the operations of selection of modulation scheme, addition of CP, addition of symbols for channel estimation and selection of OFDM symbols; feeding feedback information to the Base Station (BS); transmitting a synchronization request to the BS; transmitting a synchronization acknowledgement to the RS; transmitting information to each MT belonging to the BS; transmitting information to each MT belonging to the RS; the MT belonging to the BS transmitting ACK/NACK information to the BS; the MT belonging to the RS transmitting ACK/NACK information to the BS; and the BS informing the RS of the received ACK/NACK information.

8 Claims, 6 Drawing Sheets

RS-BASED NETWORK TRANSMISSION METHOD

PRIORITY

This application claims priority under 35 U.S.C. §119(a) to an application entitled "RS-BASED NETWORK TRANSMISSION METHOD" filed in the State Intellectual Property Office of China on Apr. 27, 2007 and assigned Serial No. 200710097588.7, the contents of which are incorporated herein by reference.

BACKGROUND OF THE INVENTION

1. Field of the Invention

The present invention relates to the technical field of cellular network technology with a Relay System (RS) application, especially to an RS-based network transmission method.

2. Description of the Related Art

At present, Relay Technique-based solutions have a common presence in the evolution of the existing IEEE 802.16 standardization. However, it has become a hotspot concerning how to apply Relay, and even how to manage the relationship between RS and Base Station (BS) and further to complete the processing of the entire system, because this directly affects the system efficiency resulting from the application of Relay technique.

In prior art, main utilization is made to the resource allocation between RS and BS and interference suppression is done by power control. However, as proven by simulation, this method results in a lower efficiency and is greatly affected by the ratio of time occupied by the transmission between RS and BS.

SUMMARY OF THE INVENTION

Accordingly, the present invention has been made to solve the above-mentioned problems and to provide an efficient transmission solution for a wireless network transmission system based on Relay technique.

In accordance with an aspect of the present invention, a Relay System (RS)-based cellular network transmission method for a Mobile Terminal (MT) having a function of Single Input and Single Output (SISO) includes transmitting broadcast information to all RSs and Mobile Terminals (MTs) by a Base Station (BS); transmitting required data to each RS in an Orthogonal Frequency Division Multiplexing (OFDM) mode by the BS; performing operations of the selection of modulation scheme, the addition of Cyclic Prefix (CP), the addition of symbols for channel estimation and the selection of OFDM symbols by the RS; feeding feedback information to the BS by the RS; transmitting a synchronization request to the BS from the RS; transmitting a synchronization acknowledgement to the RS from the BS; transmitting information to each MT belonging to the BS; transmitting information to each MT belonging to the RS; transmitting ACKnowledgement/Non-ACKnowledgement (ACK/NACK) information to the BS from the MT belonging to the BS; transmitting ACK/NACK information to the BS from the MT belonging to the RS; and informing the RS of the received ACK/NACK information by the BS.

In accordance with anther aspect of the present invention, an RS-based cellular network transmission method for an MT having a function of Multiple Input and Multiple Output (MIMO) includes transmitting broadcast information to all RSs and MTs from a BS; transmitting required data to each RS in an OFDM mode from the BS; performing the operations of selection of modulation scheme, the addition of CP, the addition of symbols for channel estimation and the selection of OFDM symbols by the RS; feeding feedback information to the BS by the RS; transmitting a synchronization request to the BS from the RS; transmitting a synchronization acknowledgement to the RS from the BS; transmitting information to each MT belonging to the BS from the BS, and simultaneously transmitting information to each MT that belongs to the RS from the BS; transmitting information to the MT belonging to the RS from the RS; combining signals from the information transmitted from the BS to each MT belonging to the BS, from the information transmitted from the BS to each MT belonging to the RS, and from the information transmitted from the RS to the MT belonging to the RS, and if the signals from the information transmitted from the BS to each MT belonging to the BS and from the information transmitted from the BS to each MT belonging to the RS is the same as the signal from the information transmitted from the RS to the MT belonging to the RS, the MT adopts Space-Time Block Code (STBC), otherwise the MT adopts Vertical Bell Laboratories Layered Space-Time (V-BLAST) technique; transmitting ACK/NACK information to the BS from the MT belonging to the BS; transmitting ACK/NACK information to the BS from the MT belonging to the RS; and informing the RS the ACK/NACK information transmitted to the BS from the MT belonging to the RS.

With the present invention, data can be transmitted from BS to RS efficiently. Therefore, sufficient time is saved for the transmissions between RS and MT, and BS and MT so that the system throughput is effectively improved.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Preconditions for the transmission scheme of the present invention are such that the system is based on Orthogonal Frequency Division Multiple Access (OFDMA); a Base Station (BS) manages all users within a cell, i.e., all signaling information is transmitted from the BS to all Mobile Terminals (MTs), and an RS serves only as a relay for transmitting data from the BS to the MTs; the Relay System (RS) is thus not used to enlarge the coverage of a cell but to improve the cell's overall throughput; the RS has only part of the BS's functions; in the present invention, RS functions are only to perform modulation and demodulation but not coding or decoding.

Figure 1:
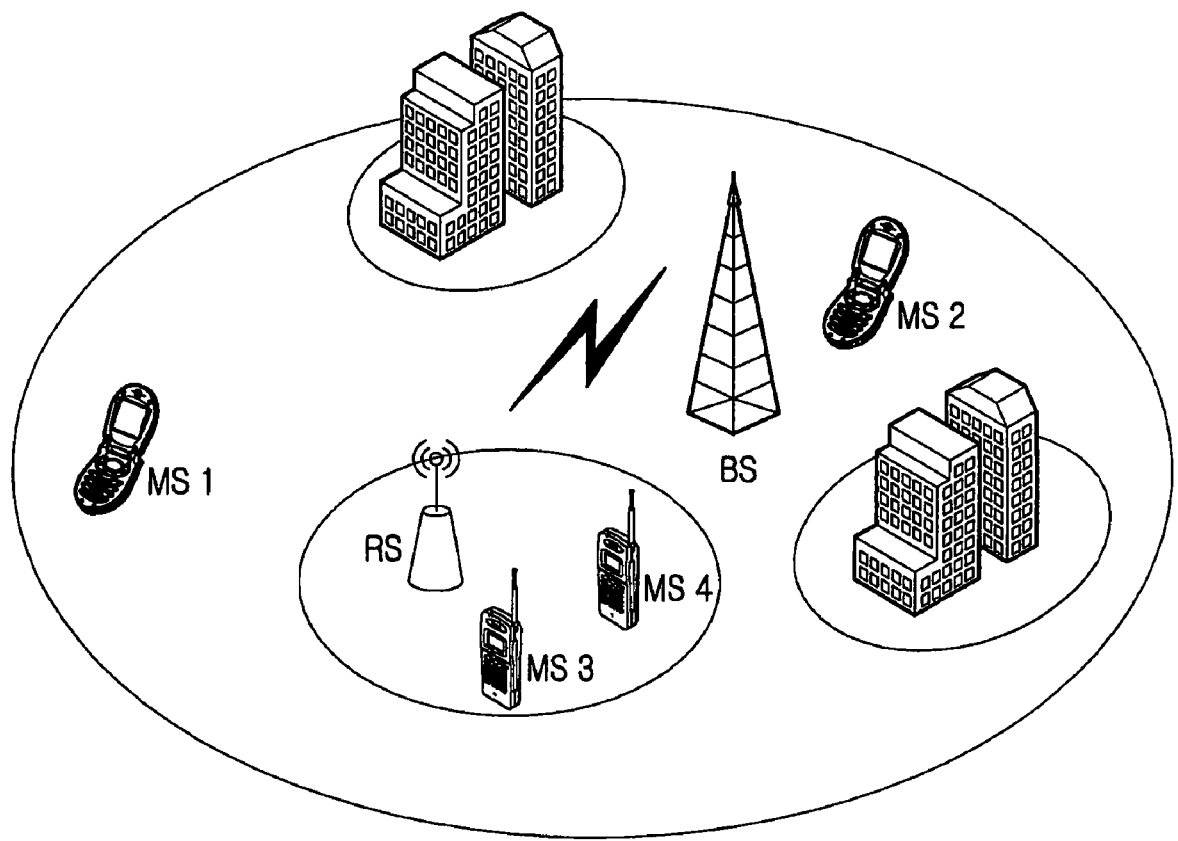
FIG. 1 is a schematic diagram illustrating the network transmission between Base Station (BS) and Relay System (RS)

As shown in FIG. 1, the BS transmits data to MS3 and MS4 via the RS, while transmitting data to MS1 and MS2 directly.

The present invention provides an RS, BS and MTs as well as a resource allocation unit. Some special preconditions in the present invention are such that the BS could directly "see" all RSs and the transmission condition between them could be regarded approximately as a Gaussian channel. This is acceptable for the pre-deployed BS and RSs.

Figure 2:
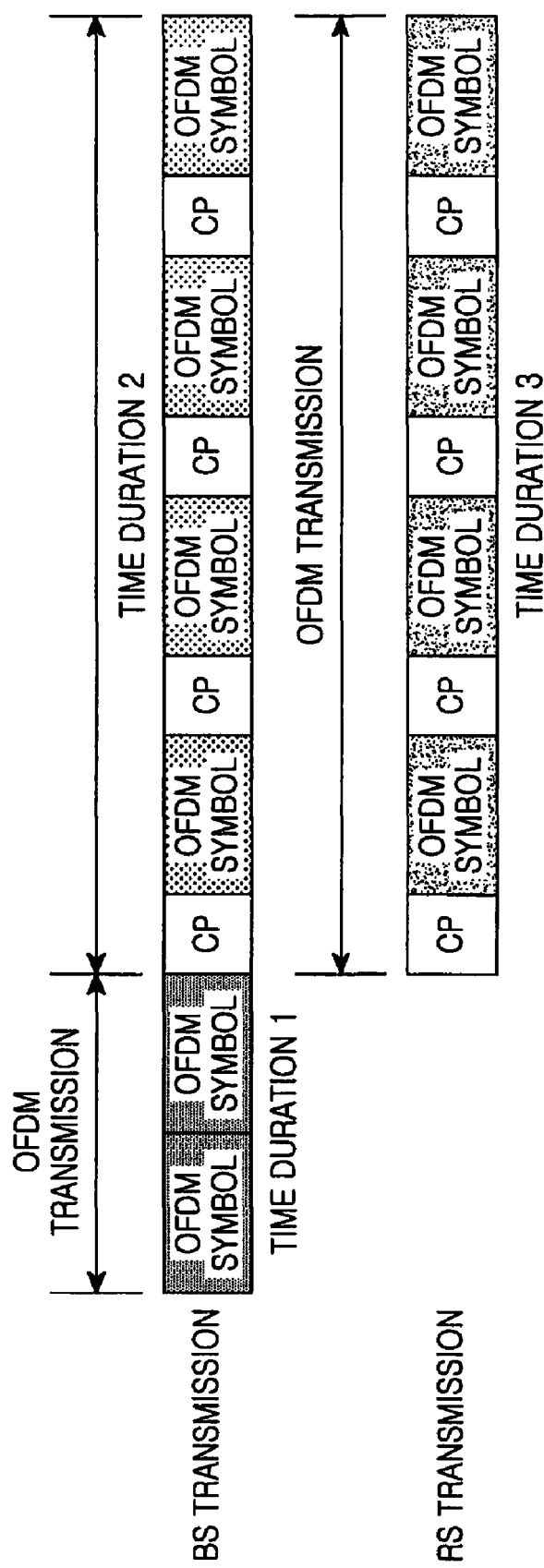
FIG. 2 is a schematic diagram illustrating the transmission between BS and RS according to the present invention.

FIG. 2 shows the specific transmission criteria in the present invention.

Figure 3:
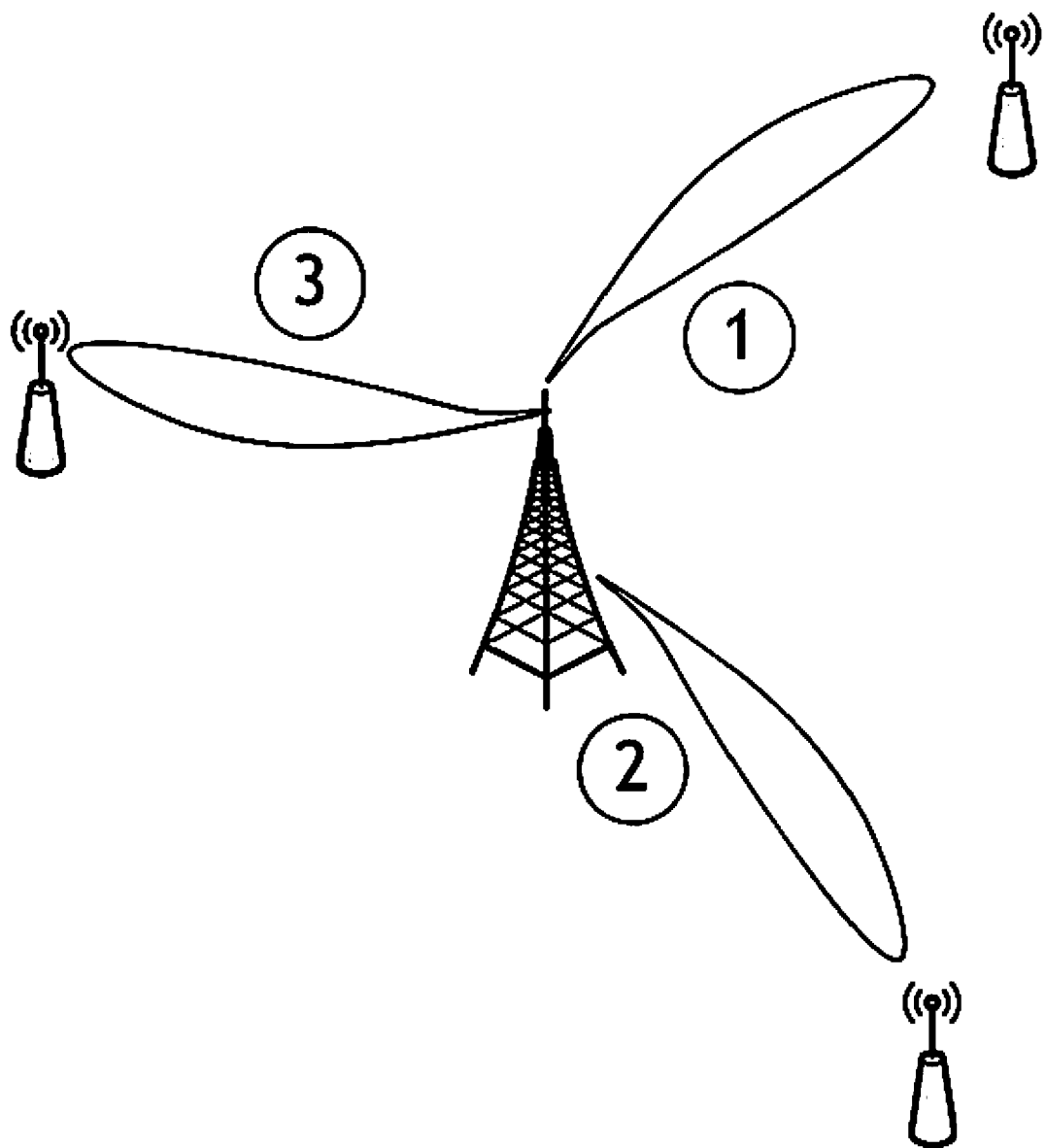
FIG. 3 illustrates a multi-antenna mode for the transmission from BS to RS.

During time interval 1, transmission is directed from the BS to each RS in the Orthogonal Frequency Division Multiplexing (OFDM) mode. If one BS needs to transmit data to multiple RSs, a multi-antenna technique must be adopted as shown in FIG. 3. Then from the BS to each of the RSs, the OFDM transmission mode can be applied. Meanwhile, transmissions from the BS to different RSs can be performed simultaneously.

Figure 6:
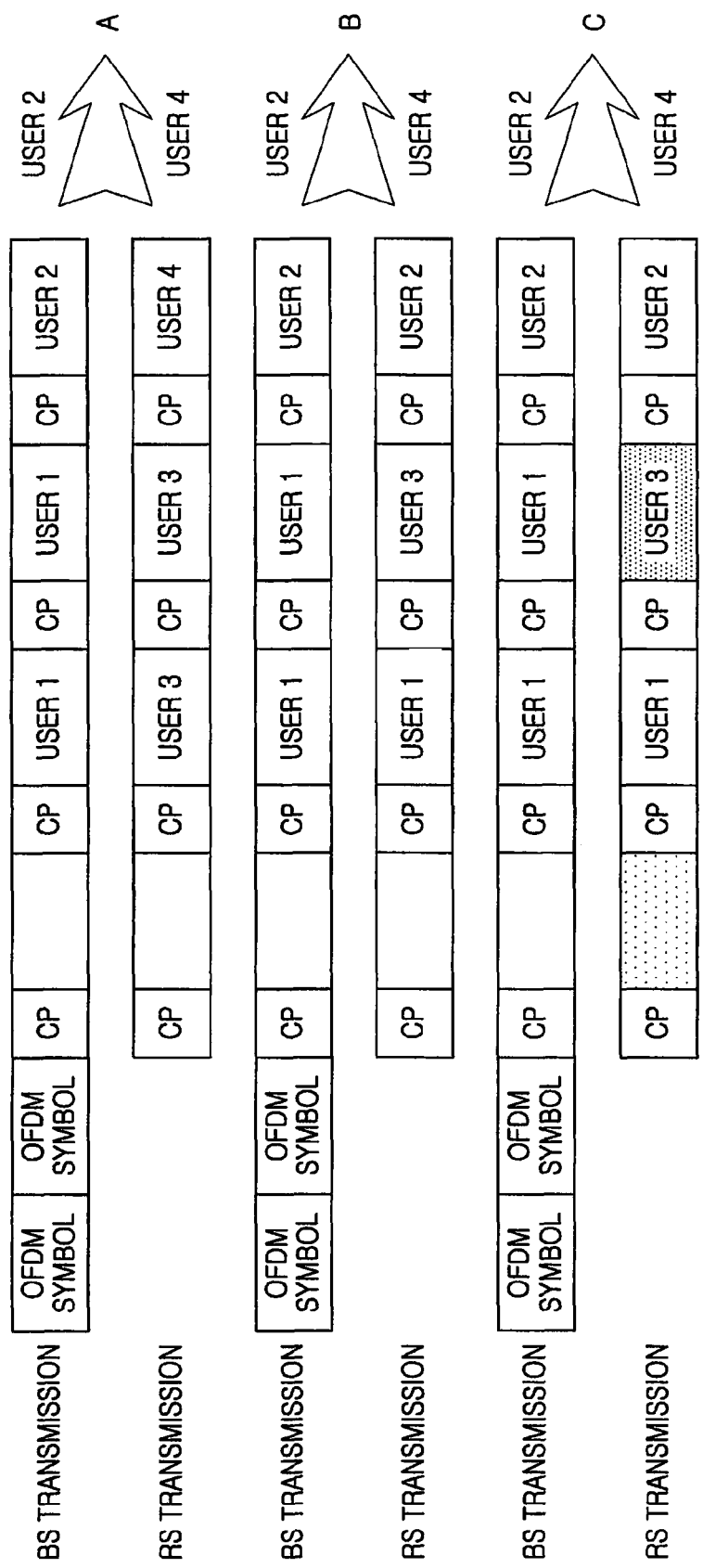
FIG. 6 illustrates the selection of system transmitting mode.

Transmissions at time intervals 2 and 3 can be performed simultaneously. More specifically, the transmission from the BS to the MT is performed at time interval 2, and the transmission from the RS to the MT is performed at time interval 3. The OFDMA mode is applied to both of time intervals 2 and 3, and three different approaches are adopted depending on different receiving functions of the MTs:

In an embodiment of the present invention, if the MTs do not have the function of space de-multiplexing, the BS transmits data to MS1 and MS2, and the RS transmits data to MS3 and MS4, as shown in part A of FIG. 6.

In another embodiment of the present invention, if the MTs have the function of space de-multiplexing, the RS transmits data to MS3 and MS4, and the BS transmits data to both MS1 and MS2 as well as MS3 and MS4; for each time-frequency unit, the data that the BS transmits to MS3 and MS4 are the same that the RS transmits to MS3 and MS4, as shown in part B of FIG. 6. In yet another embodiment of the present invention, it is substantially the same as the embodiment shown in part B of FIG. 6 except that data the BS transmits to MS3 and MS4 are different from data the RS transmits to MS3 and MS4, as shown in part C of FIG. 6.

In the present invention, since the channel condition for transmission between the BS and the RS is good, a high-level modulation mode is adopted. On the other hand, due to the degraded channel condition between the RS and the MT, the modulation mode should be lowered. Therefore, it is necessary for the RS to perform part of the demodulation function to distribute information on one sub-carrier to several sub-carriers.

Figure 4:
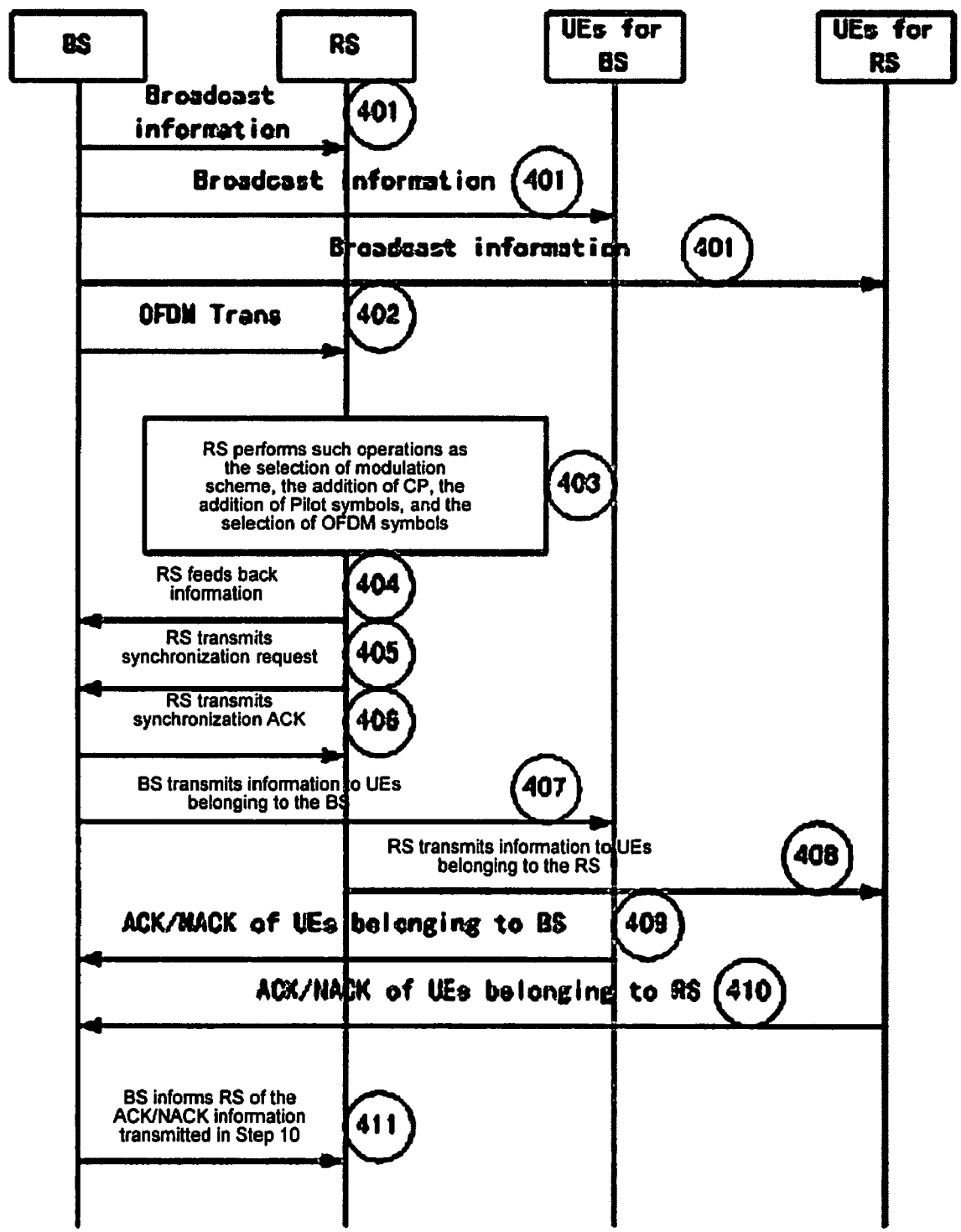
FIG. 4 illustrates the processing performed in the case of A Single Input and Single Output Mobile Terminal (MT)
Figure 5:
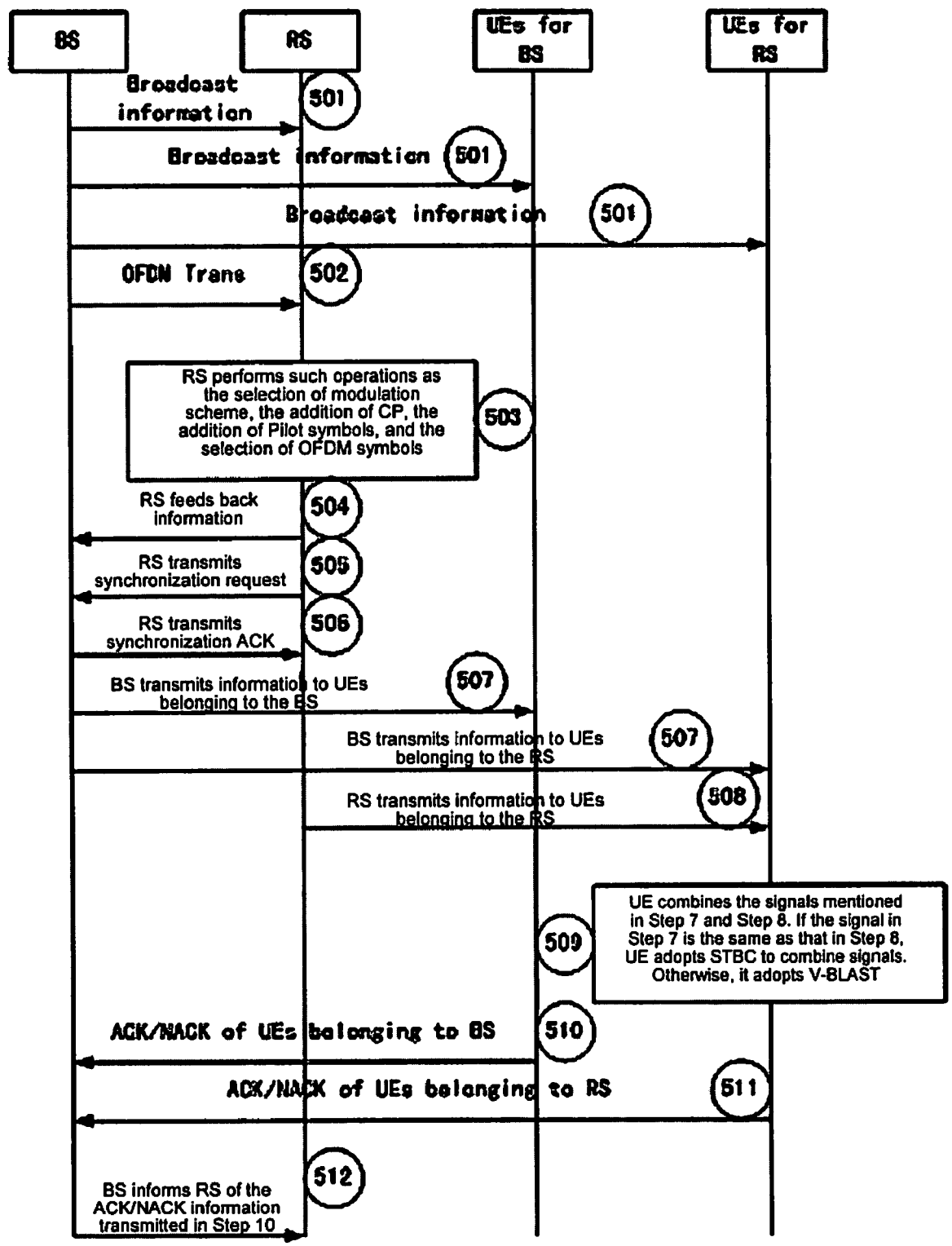
FIG. 5 illustrates the processing performed in the case of a Multiple Input and Multiple Output MT.

FIGS. 4 and 5 illustrate two operating processes in accordance with the present invention. FIG. 4 illustrates the operating process performed in the case of a Single Input and Single Output (SISO) MT.

Referring to FIG. 4, a BS transmits broadcast information to all RSs and MTs in step 401 and the BS transmits required data to each RS in the OFDM mode in step 402. In step 403, the RS performs such operations as selection of the modulation scheme, the addition of Cyclic Prefix (CP), the addition of symbols for channel estimation and the selection of OFDM symbols. In step 404, the RS feeds feedback information to the BS and in step 405, the RS transmits a synchronization request to the BS.

In step 406, the BS transmits a synchronization acknowledgement (ACK) to the RS, i.e., it is allowed to perform synchronization transmission between the BS and the RS. In step 407, the BS transmits information to each MT belonging to the BS and the RS transmits information to each MT belonging to the RS in step 408. The MT belonging to the BS transmits ACK/NACK information to the BS in step 409 and the MT belonging to the RS transmits ACK/NACK information to the BS in step 410. Finally, in step 411, the BS informs the RS of the ACK/NACK information received in Step 410.

FIG. 5 illustrates the operating process performed in the case of a Multiple Input and Multiple Output (MIMO) MT.

Referring to FIG. 5, a BS transmits broadcast information to all RSs and MTs in step 501 and the BS transfers required data to each RS in the OFDM mode in step 502. In step 503, the RS performs such operations as selection of the modulation scheme, the addition of CP, the addition of symbols for channel estimation and the selection of OFDM symbols.

In step 504, the RS feeds feedback information to the BS and in step 505, the RS transmits a synchronization request to the BS.

The BS transmits a synchronization ACK to the RS, i.e., it is allowed to perform synchronization transmission between the BS and the RS in step 506 and the BS transmits information to each MT belonging to the BS; at the same time, it transmits information to each MT that belongs to the RS in step 507. The RS transmits information to the MT belonging to the RS in step 508 and in step 509, the MT combines the signals mentioned in Step 507 and Step 508. If the signal in Step 507 is the same as that in Step 508, the MT adopts Space-Time Block Coding (STBC) to combine the signals; otherwise, it adopts V-BLAST.

In step 510, the MT belonging to the BS transmits ACK/NACK information to the BS and in step 511, the MT belonging to the RS transmits ACK/NACK information to the BS.

Finally in step 512, the BS informs the RS of the ACK/NACK information received in Step 511.

While the invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A Relay System (RS)-based cellular network transmission method for MT having a function of Single Input and Single Output (SISO) comprising steps of:
   transmitting broadcast information to all RSs and MTs by a Base Station (BS);
   transmitting required data to each RS in an Orthogonal Frequency Division Multiplexing (OFDM) mode by the BS;
   performing operations of selection of modulation scheme, addition of Cyclic Prefix (CP), addition of symbols for channel estimation and selection of OFDM symbols by the RS;
   feeding feedback information to the BS by the RS;
   transmitting a synchronization request to the BS by the RS;
   transmitting a synchronization acknowledgement to the RS by the BS;
   transmitting information to each MT belonging to the BS by the BS;
   transmitting information to each MT belonging to the RS by the RS;
   transmitting ACKnowledgement/Non-ACKnowledgement (ACK/NACK) information to the BS by the MT belonging to the BS;

transmitting ACK/NACK information to the BS by the MT belonging to the RS; and informing the RS of the received ACK/NACK information by the BS.

2. The method according to claim 1, wherein the selection of the modulation scheme performed by the RS comprises:

partially demodulating data transmitted from the BS to the RS in accordance with a channel condition between the RS and the BS by the RS; and dividing data on one sub-carrier into two parts and distributing them on two sub-carriers for transmission by the RS.

3. The method according to claim 1, wherein the selection of BS transmission and RS transmission comprises:

determining whether the MT needs to perform space diversity or space multiplexing, and when the MT needs to perform space diversity or space multiplexing, determining that both of the BS and the RS transmit data to a user simultaneously, and when the MT does not need to perform space diversity or space multiplexing, determining that the BS transmits data to the RS and then the RS forwards the data to the MT.

4. A Relay System (RS)-based cellular network transmission method for MT having a function of Multiple Input and Multiple Output (MIMO) comprising steps of:

transmitting broadcast information to all RSs and MTs by a BS;

transmitting required data to each RS in an OFDM mode by the BS;

performing operations of selection of modulation scheme, addition of Cyclic Prefix (CP), addition of symbols for channel estimation and selection of Orthogonal Frequency Division Multiplexing (OFDM) symbols by the RS;

feeding feedback information to the BS by the RS;

transmitting a synchronization request to the BS by the RS;

transmitting a synchronization acknowledgement to the RS by the BS;

transmitting information to each MT belonging to the BS by the BS, and simultaneously transmitting information to each MT that belongs to the RS by the BS;

transmitting information to the MT belonging to the RS by the RS;

combining signals from the information transmitted from the BS to each MT belonging to the BS, from the information transmitted from the BS to each MT belonging to the RS, and from the information transmitted from the RS to the MT belonging to the RS, and if the signals from the information transmitted from the BS to each MT belonging to the BS and from the information transmitted from the BS to each MT belonging to the RS is the same as the signal from the information transmitted from the RS to the MT belonging to the RS, the MT adopts Space-Time Block Coding (STBC), otherwise the MT is adopting Vertical Bell Laboratories Layered Space-Time Architecture (V-BLAST);

transmitting ACK/NACK information to the BS by the MT belonging to the BS;

transmitting ACK/NACK information to the BS by the MT belonging to the RS; and informing the RS of the ACK/NACK information received in the BS by the MT belonging to the RS.

5. The method according to claim 4, wherein the selection of the modulation scheme performed by the RS comprises:

partially demodulating data transmitted from the BS to the RS in accordance with a channel condition between the RS and the BS by the RS; and dividing data on one sub-carrier into two parts and distributing them on two sub-carriers for transmission by the RS.

6. The method according to claim 4, wherein the selection of BS transmission and RS transmission comprises:

determining whether the MT needs to perform space diversity or space multiplexing, and when the MT needs to perform space diversity or space multiplexing, determining that both of the BS and the RS transmit data to a user simultaneously, and when the MT does not need to perform space diversity or space multiplexing, determining that the BS transmits data to the RS and then the RS forwards the data to the MT.

7. The method according to claim 4, wherein the data the BS transmits to an MT is the same as the data the RS transmits to the same MT.

8. The method according to claim 4, wherein the data the BS transmits to an MT is different from the data the RS transmits to the same MT.

* * * * *